(12) United States Patent
Nakai (10) Patent No.: US 7,252,488 B2
(45) Date of Patent: Aug. 7, 2007

(54) FORMING MOLD

(75) Inventor: Yoshiyuki Nakai, Kobe (JP)

(73) Assignee: Sumitomo Rubber Industries, Ltd., Kobe-Shi, Hyogo-Ken (JP)

( * ) Notice: Subject to any disclaimer, the term of this patent is extended or adjusted under 35 U.S.C. 154(b) by 43 days.

(21) Appl. No.: 11/110,754

(22) Filed: Apr. 21, 2005

(65) Prior Publication Data

US 2005/0238744 A1    Oct. 27, 2005

(30) Foreign Application Priority Data

Apr. 23, 2004    (JP) .............................. 2004-128582

(51) Int. Cl.
*B29C 33/10*    (2006.01)
(52) U.S. Cl. ..................... 425/28.1; 249/141; 425/116; 425/470; 425/812
(58) Field of Classification Search ............... 425/28.1, 425/116, 470, 812; 249/141
See application file for complete search history.

(56) References Cited

U.S. PATENT DOCUMENTS

| 4,691,431 | A | 9/1987 | Hayata |
| 5,066,209 | A | 11/1991 | Schmaderer et al. |
| 5,234,326 | A * | 8/1993 | Galli et al. ................. 425/812 |
| 5,800,642 | A * | 9/1998 | Ohya ......................... 425/812 |
| 5,800,764 | A | 9/1998 | Smeyak et al. |
| 6,367,765 | B1 | 4/2002 | Wieder |
| 6,663,377 | B1 * | 12/2003 | Dean et al. ................. 425/190 |
| 6,877,974 | B2 * | 4/2005 | Puniello et al. ............ 425/812 |
| 2002/0009513 | A1 | 1/2002 | Dean, Jr. et al. |
| 2002/0079615 | A1 | 6/2002 | Puniello et al. |

FOREIGN PATENT DOCUMENTS

| EP | 0753419 A2 | 1/1997 |
| JP | 03284910 | 12/1991 |

* cited by examiner

*Primary Examiner*—James P. Mackey
(74) *Attorney, Agent, or Firm*—Birch, Stewart, Kolasch & Birch, LLP (57) ABSTRACT

A mold used to form a rubber or resin article which includes a shaping surface for shaping a surface of an object to be molded, and a vent structure for releasing air between the shaping surface and the surface, wherein the vent structure includes EDM vents each having a gap of not more than 0.1 mm at the shaping surface.

12 Claims, 7 Drawing Sheets

FORMING MOLD

BACKGROUND OF THE INVENTION

The present invention relates to a forming mold, more particularly to a shaping surface provided with a vent structure capable of efficiently releasing or removing air between the shaping surface and a material to be molded without producing unwanted protrusions such as spew and burr on the molded article.

In a forming mold for vulcanizing a rubber tire, curing a rubber article, injection molding or the like, if air remains between the shaping surface of the mold and the molded article, unwanted void or bareness of the material is formed in the molded surface. Therefore, various vent means are employed. For example, in case of a mold for curing a rubber article or vulcanizing a rubber tire, conventionally, vent holes and slit vents are used. In case of a mold for injection molding a golf ball, annular slit vent is employed.

The vent hole has a diameter of about 1 or 2 mm and formed in the shaping surface. Thus, the raw material (rubber) can easily flow out into the vent holes, and a number of spews are formed on the molded surface.

The slit vent is a narrow gap formed between metal parts of the mold. Thus, the formation of protrusions such as burr can be avoided. But, the position of the slit vent is very restricted and often combination use with vent holes is necessitated.

SUMMARY OF THE INVENTION

It is therefore, an object of the present invention to provide a forming mold and a method of making the same in which a groove-like vent can be easily formed at a desired position with a desired length, and the formation of protrusion such as spew and burr can be effectively prevented without using vent holes.

According to the present invention, a forming mold comprises a shaping surface and a vent structure for releasing air between the shaping surface and an object to be molded, wherein said vent structure includes EDM vents.

In this specification, an EDM vent is a micro groove formed by electric discharge machining (EDM) using a very thin wire or a thin conductor, and having a very narrow gap at the shaping surface of the mold. Although the upper limit of the gap depends on the material to be molded, the gap is less than about 100 micro meter.

BRIEF DESCRIPTION OF THE DRAWINGS

Embodiments of the present invention will now be described in conjunction with the accompanying drawings.

First Embodiment (Mold for Vulcanizing a Rubber Tire)

DETAILED DESCRIPTION OF THE INVENTION

In FIGS. 1-4, a mold 1A according to the present invention is for vulcanizing a pneumatic rubber tire T.

Figure 1:
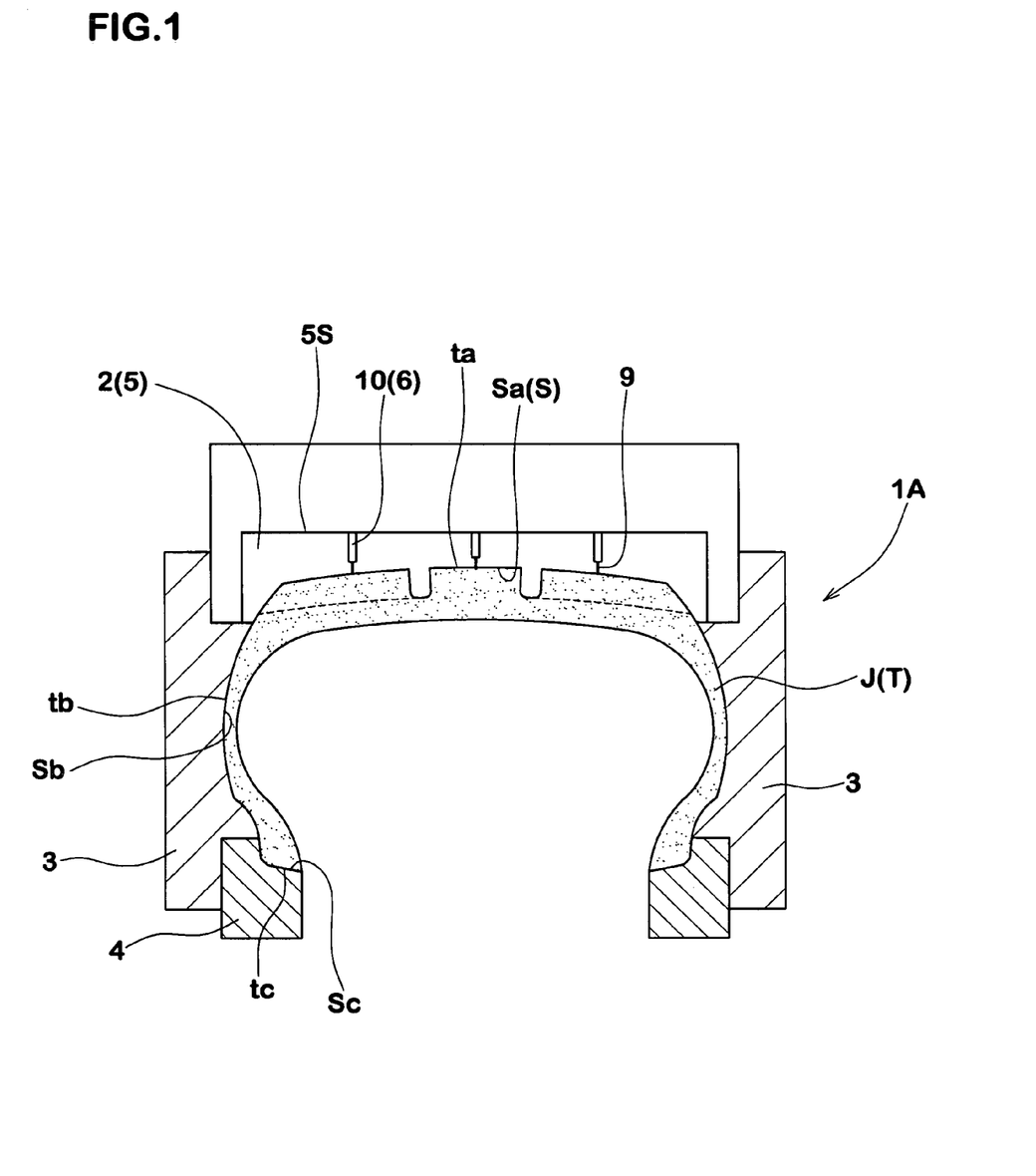
FIG. 1 is a cross-sectional view of a segmental mold for vulcanizing a rubber tire according to the present invention.

The mold 1A comprises: a tread die 2; a pair of upper and lower sidewall dies 3; and a pair of upper and lower bead dies 4. The tread die 2 has a shaping surface sa for forming a tread portion ta of the tire. The sidewall dies 3 each have a shaping surface Sb for forming a sidewall portion tb of the tire. The bead dies 4 each have a shaping surfaces sc for forming a bead portion tc of the tire. In the closing state of the mold, the shaping surfaces Sa, Sb and Sc collectively form a shaping surface S.

In order to form tread grooves in the tread portion ta of the tire, projecting ribs 8 are formed on the tread shaping surface sa.

Figure 2:
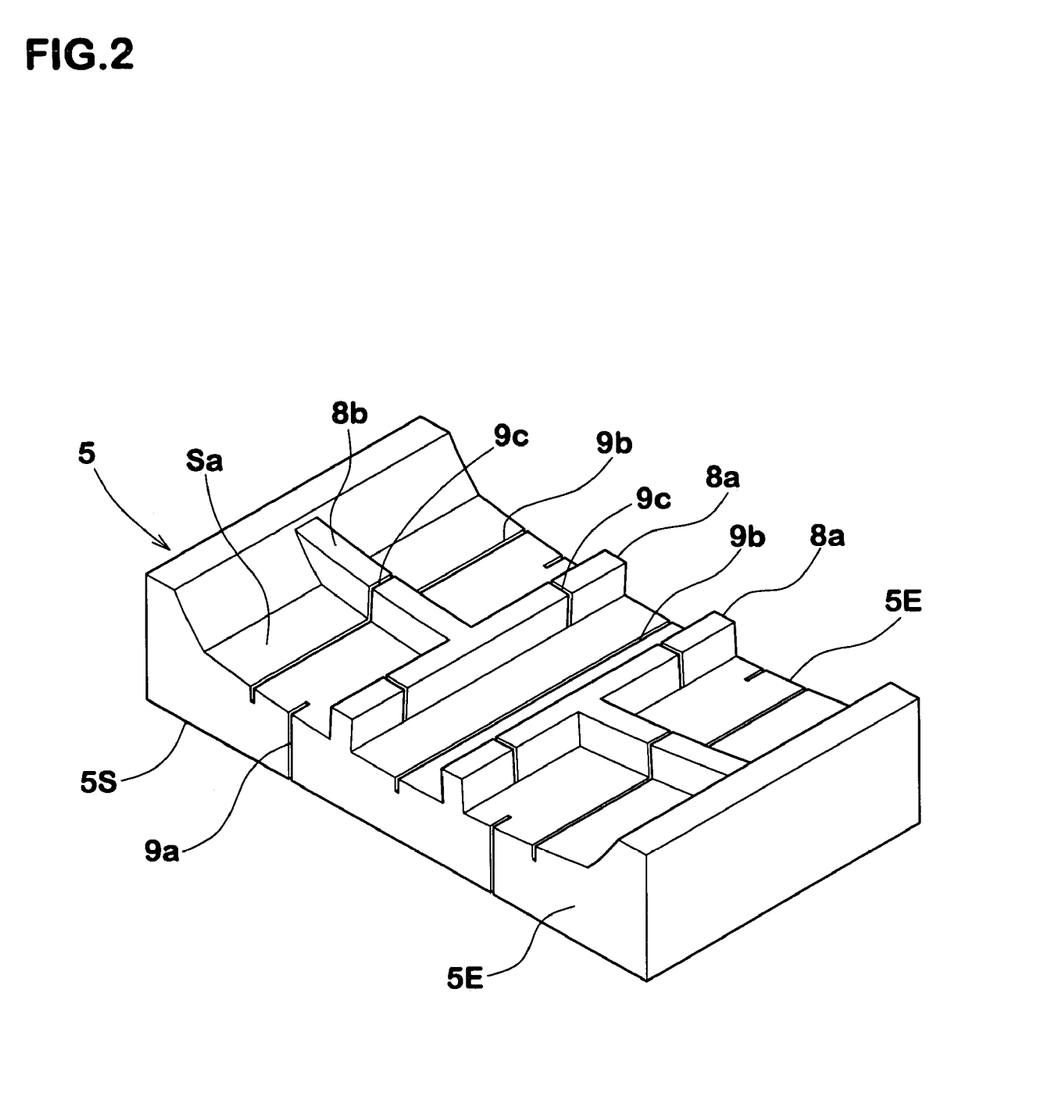
FIG. 2 is a perspective view of a segment thereof provided with EDM vents.

In this embodiment, the tread die 2 is circumferentially divided into a plurality of segments 5 as shown in FIG. 2, wherein each segment 5 is provided with two circumferential ribs 8a and a lateral rib 8b extending axially outwardly from each of the circumferential ribs 8a.

The mold 1A is provided with a vent structure which comprises: EDM vents 9 (9a, 9b, 9c) opened at the shaping surface S(Sa); and duct portions 6 connected with the EDM vents and extending to the outside of the mold with this, the conventional vent holes are eliminated.

The segment 5 is provided with first, second and third EDM vents 9a, 9b and 9c.

The first EDM vents 9a are formed at the circumferential ends 5E of the segment 5. In each of the end surfaces (5E), the first vents 9a extends straight across the entire thickness of the segment 5 from the shaping surface sa to an outer surface 5S of the segment 5 facing the duct portion 6. Thus, the outer ends of the first vents 9a are opened to the duct portions 6, and the inner ends of the first vents 9a are opened to the inside of the mold.

Figure 3A:
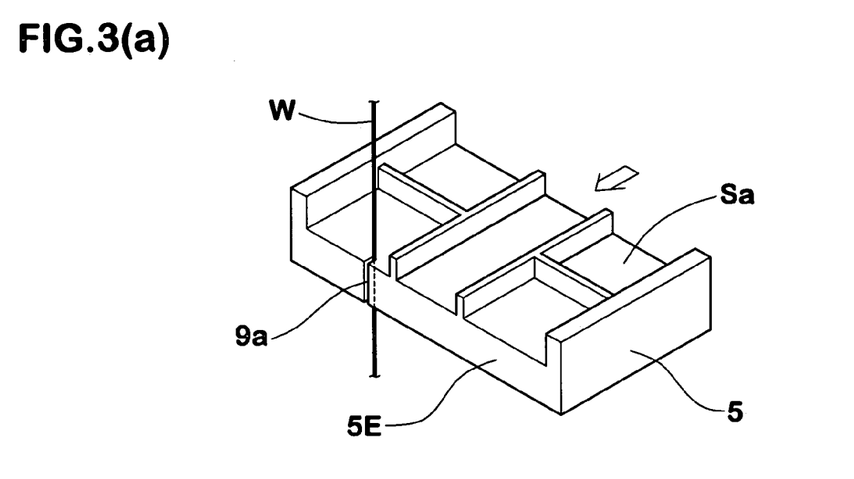
FIGS. 3(a), 3(b) and 3(c) are schematic perspective views for explaining a method of forming EDM vents.

AS shown in FIG. 3(a), the first EDM vent 9a can be formed by relatively progressing the end 5E of the segment 5 slowly towards the discharge wire W, while keeping the shaping surface sa substantially at right angles with respect to the wire w.

The second EDM vents 9b are formed straightly across the entire circumferential length of the shaping surface sa from one end 5E to the other end 5E, and the bottom of each second EDM vent 9b reaches to one of the duct portions 6 or an extension hole 10 from one of the duct portions 6.

Figure 3B:
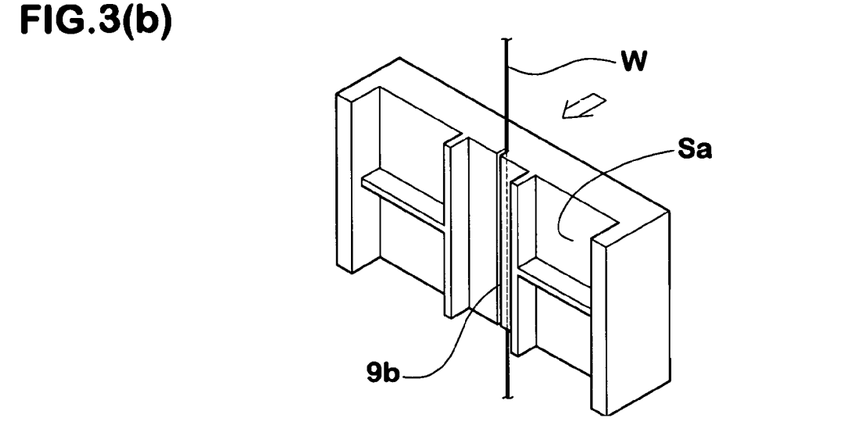

As shown in FIG. 3(b), the second vents 9b can be formed by relatively progressing the shaping surface sa toward the wire W, while keeping the shaping surface Sa substantially parallel to the wire W.

Figure 3C:
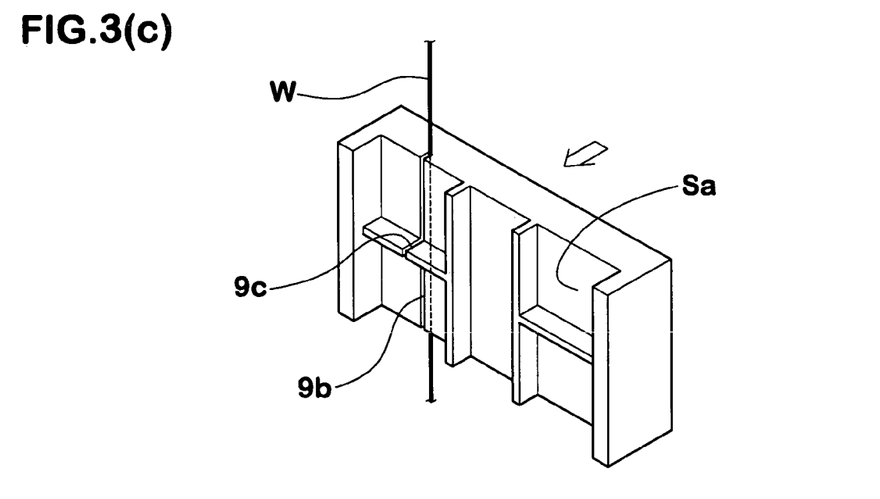

The third EDM vents 9c are formed straightly across the entire widths of the protecting ribs R, cutting across the substantially entire height thereof. AS shown in FIG. 3(c), the third vents 9c can be formed in the same way as the second vent 9b. As known from FIGS. 2 and 3(c), in case of the lateral rib 8b, after the formation of a third vent 9c across the ribs 8b, a second vent 9b can be formed in succession. Incidentally, in case of a third vent 9c across a circumferential rib 8a, by the use of a wire holder with a short span, the EDM vent is formed in the same way as above.

Figure 4:
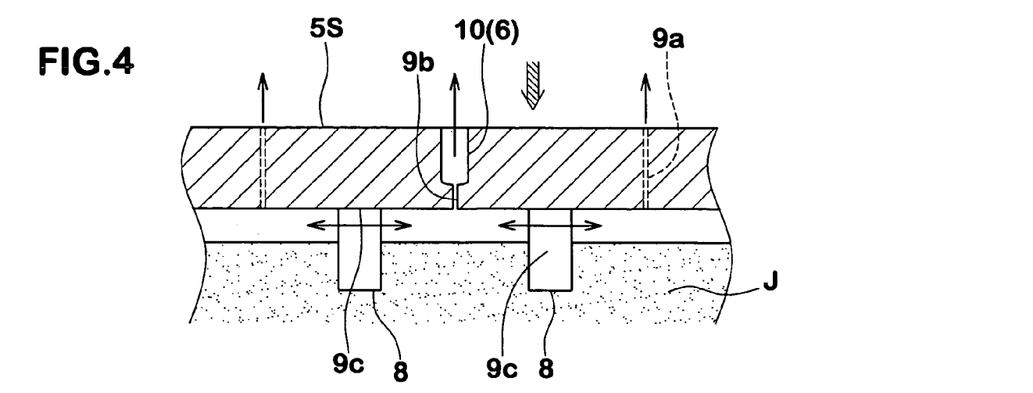
FIG. 4 is a schematic cross-sectional view for explaining the functions of the respective EDM vents.

When a raw tire is disposed in the mold and then the mold is closed, as shown in FIG. 4, the ribs 8 first contact with the surface of the raw material (rubber) J and penetrates thereinto. Therefore, if the third EDM vents 9c are not provided, as the ribs 8 hinder air flow, air is liable to be entrapped between the ribs. By providing the EDM vents 9c cutting across the ribs 8, the air can escape therethrough to the near first and second EDM vents 9a and 9b, and discharged to the outside.

The gap of the EDM vent has to be narrow enough not to pass the unvulcanized rubber but the air. For this reason, at the shaping surface, the gap is set in a range of not more than 0.12 mm, preferably not more than 0.04 mm, but preferably more than 0.01 mm. In order to form such a very narrow gap, it is necessary to use a very thin wire W having a diameter of less than 0.1 mm, preferably less than 0.03 mm as the discharge electrode.

As described above, the EDM vents 9a-9c can be formed at desired positions for various tread patterns, and necessary and sufficient air-removing effect can be obtained without making vent holes.

Second Embodiment (Mold for Press Forming a Strip of Rubber)

Figure 5:
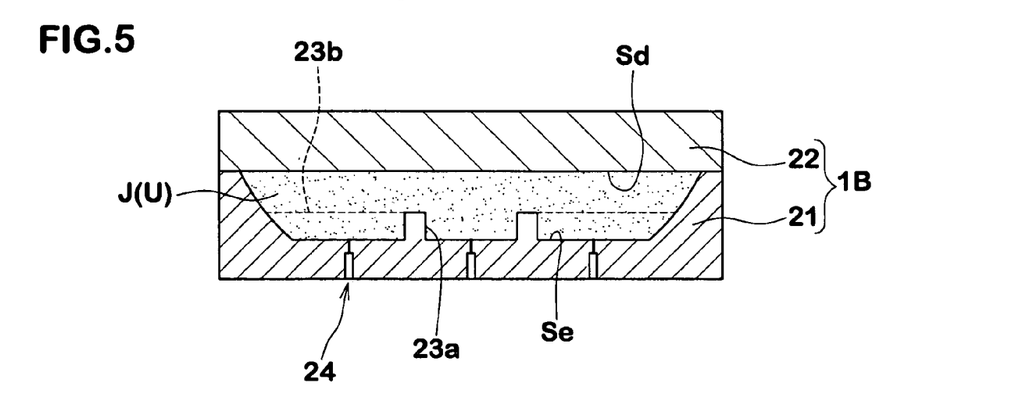
FIG. 5 is a cross-sectional view of a mold for curing and press forming a precure tread rubber strip according to the present invention.
Figure 6:
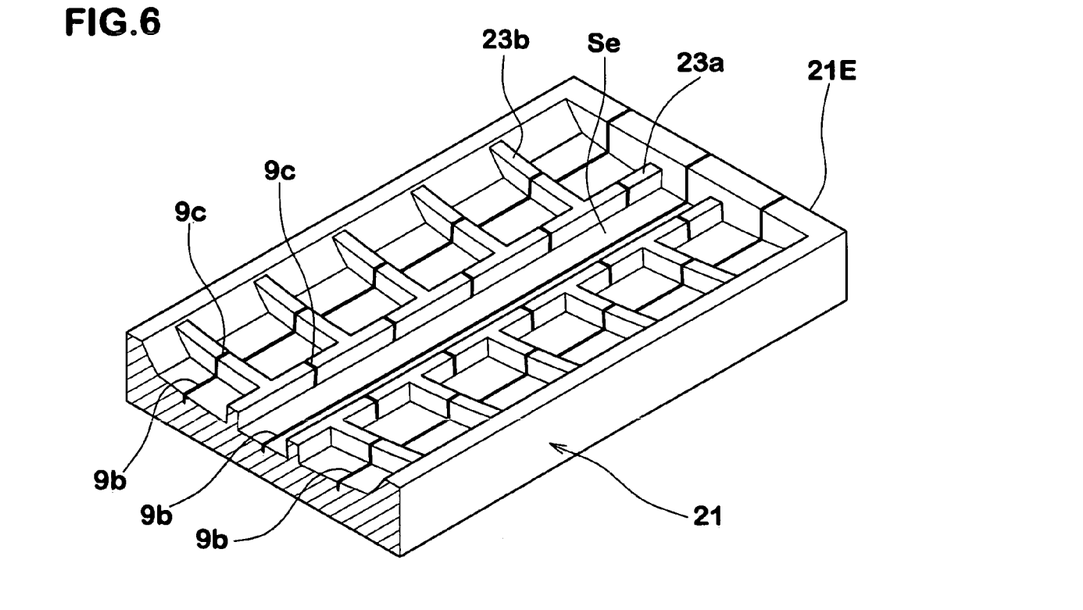
FIG. 6 is a perspective view of a tread die thereof provided with EDM vents.

FIGS. 5 and 6 show a mold 1B for press forming a strip of precure tread rubber U used to retread a pneumatic tire.

In this example, the mold 1B is a split mold comprising: a lower tread die 21 having a shaping surface se for forming a tread surface of the tread rubber U: and an upper flat die 22 having a substantially flat shaping surface Sd for forming the reverse surface of the tread rubber U. In the state in which the mold is closed, a cavity is formed between the shaping surfaces Sd and Se.

Like the first embodiment, the lower tread die 21 is provided in the tread shaping surface se with projecting ribs 23 to form tread grooves. The ribs 23 include circumferential ribs 23a and lateral ribs 23b extending axially outwardly from the circumferential ribs 23a.

Further, the lower tread die 21 is provided with a vent structure comprising EDM vents 9 formed by wire electric discharge machining like in the above-mentioned embodiment with this, the conventional vent holes are not provided.

As shown in FIG. 6, the EDM vents 9 include: the second vents 9b extending straightly over the entire length of the lower tread die 21 from one end 21E to the other in the longitudinal direction thereof; and the third vents 9c straightly cutting across the ribs 23. For the same reason as above, at least at the shaping surface, the gap is set in a range of not more than 0.12 mm, preferably not more than 0.04 mm, but preferably more than 0.01 mm. Therefore, a very thin wire w of less than 0.1 mm, preferably less than 0.03 mm in diameter is used as explained above.

Third Embodiment (Mold for Injection Molding a Resinous Article)

Figure 7:
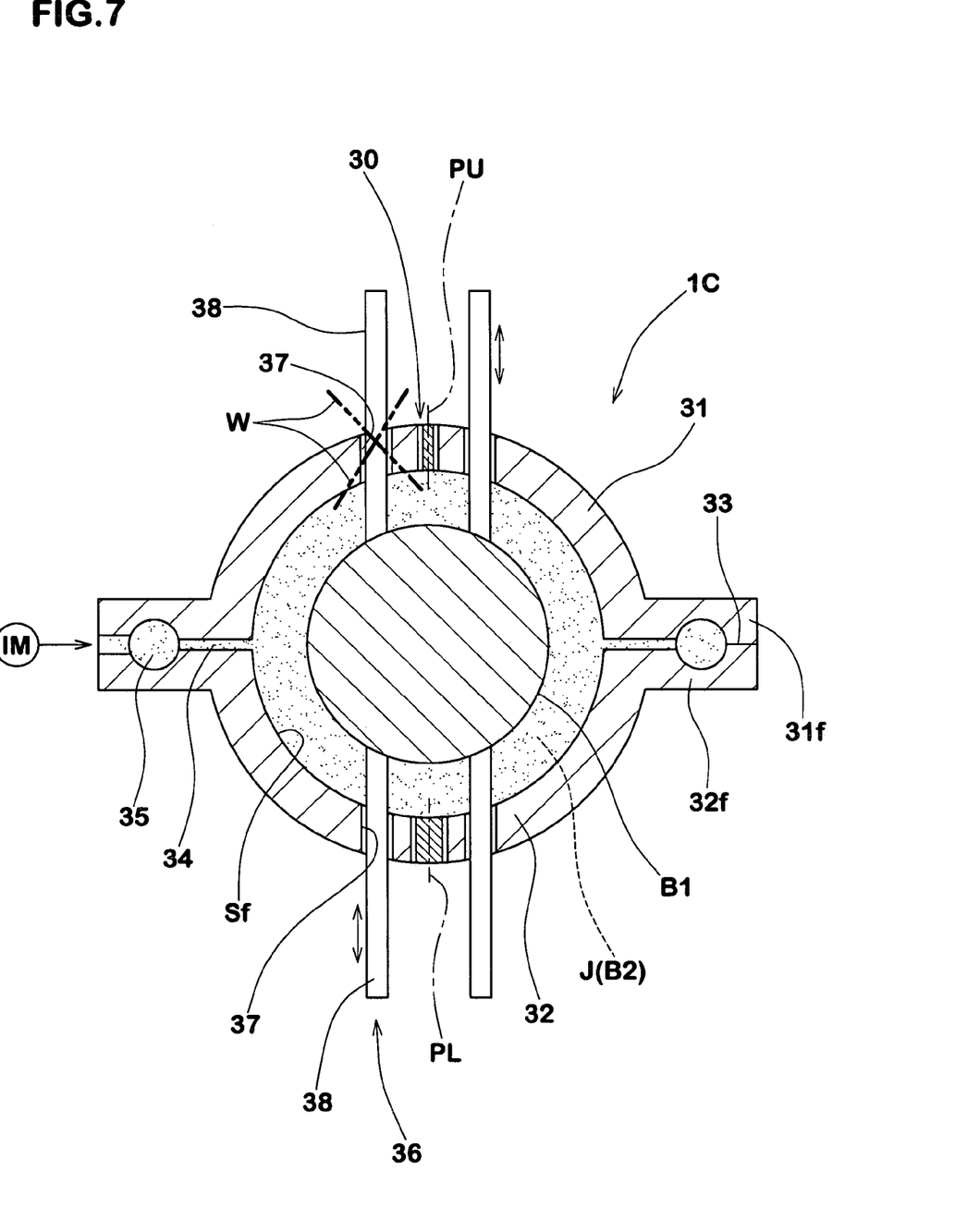
FIG. 7 is a cross-sectional view of a mold for injection molding a golf ball.

FIG. 7 shows a mold 1c for injection molding a golf ball.

In this example, the golf ball is made up of a core B1 and an outer cover B2 made of a synthetic resin such as ionomer resin. The mold is used to cure the synthetic resin.

This mold 1C is a split mold comprising a pair of upper and lower hemispherical dies 31 and 32. In the closed state, the flanges 31f and 32f of the hemispherical dies 31 and 32 are butt-jointed, and a cavity surrounded by a spherical shaping surface Sf is formed. The shaping surface Sf is provided with a plurality of spherical protrusions 39 for forming dimples on the golf ball surface.

In the joint portion 33, between the flanges 31f and 32f, an annular runner 35 or passage for the resin is formed so as to encircle the cavity, and also a plurality of gates 34 or small through holes extending radially from the cavity to the runner 35 are formed. Through the runner 35 and gates 34, the resin supplied by an injection apparatus IM is injected into the cavity.

Figure 8A:
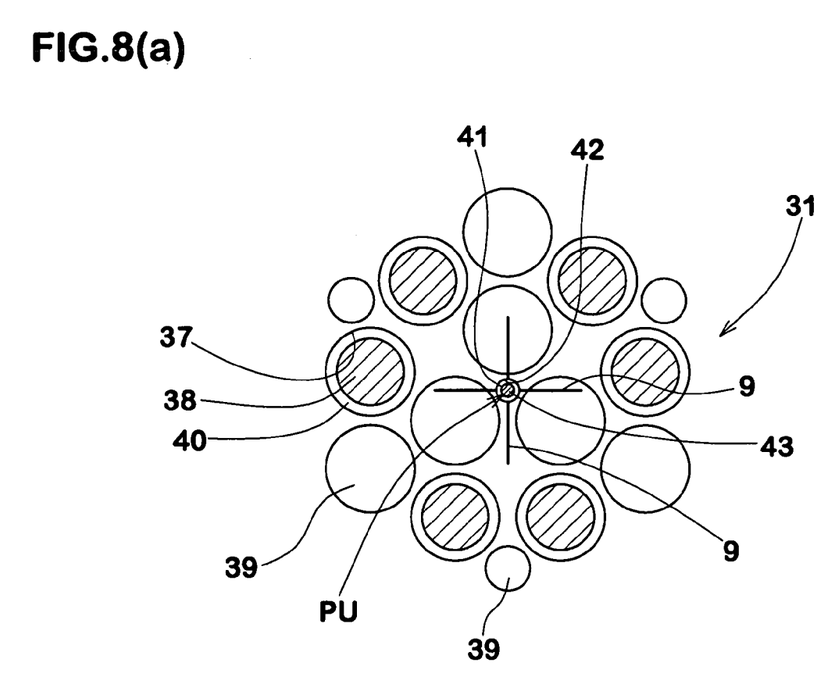
FIGS. 8(a) and 8(b) are diagrams showing shaping surfaces thereof provided with EDM vents.
Figure 8B:
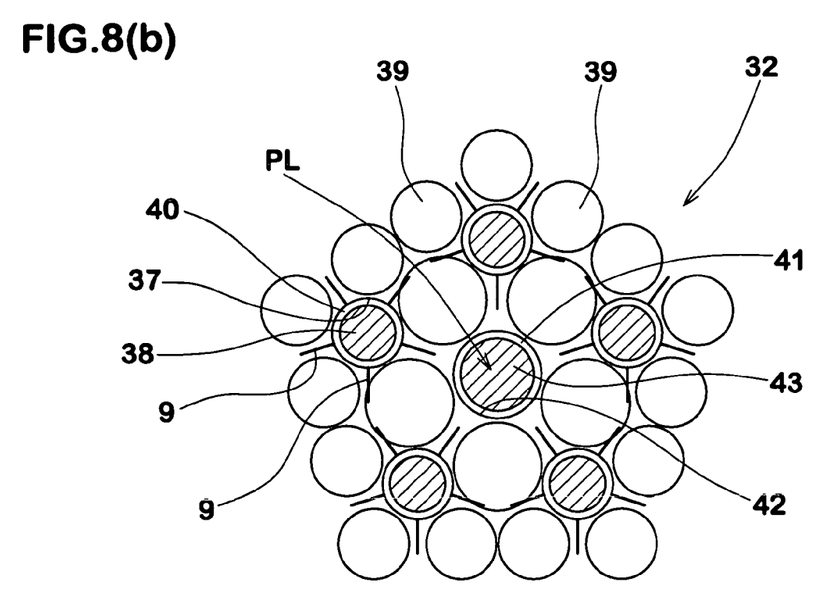

Before injecting the resin, the core B1 is disposed in the cavity. Therefore, the mold is provided with pins 38 in order to support the core B1 at the center of the cavity. The core support pins 38 extend from the outside of the mold into the cavity through inserting holes 37. The inserting holes 37 are provided on the upper and lower dies 31 and 32. As shown in FIGS. 8(a) and 8(b) which show an arrangement of the protrusions 39 corresponding to the arrangement of the dimples, three or more holes are provided around each of the upper and lower poles PU and PL in a symmetrical manner about the pole. Thus, the core B1 is supported between the tip ends of the support pins 38 protruding from the shaping surface Sf of the upper die 31 and the tip ends of the support pins 38 protruding from the shaping surface Sf of the lower die 32.

In this example, the centers of the inserting holes 37 are aligned with the centers of some of the dimple-forming protrusions 39. The diameter of the hole 37 is slightly smaller than the that of the protrusion 39. The tip end of the support pin 38 has a spherical profile which is the same as that of the protrusion 39 to define a part or whole of the protrusion 39.

In FIGS. 8(a) and 8(b), it seems like there is a wide gap between the pin and hole. But, this is only for the sake of easy understanding. In actuality, the gap is very narrow and almost invisible.

When a golf ball is to be made, a core B1 is put in the cavity so as to be supported by the protruding pins 38 as shown in FIG. 7, and a resin J is injected between the core B1 and shaping surface Sf of the mold. Just before the completion of the injection, the support pins 38 on the upper side and then lower side are retreated into the holes 37 so that the tip ends of the pins 38 align with the shaping surface Sf. In this state, the resin J is hardened.

As to the vent structure, on the other hand, this embodiment is provided with annular slit vents 40, 41 as well as the EDM vents 9.

The annular slit vent 40 is a micro-gap formed between the above-mentioned pin 38 and hole 37. The annular slit vents 41 is a micro-gap formed between a hole 42 formed at the position of the pole PU, PL, and a pin 43 inserted therein.

In this example, as shown in FIG. 8(b), one of the dimple forming protrusions 39 is provided at the pole of the lower die 32. The hole 42 is formed, aligning its center with the center of the protrusion 39 like the hole 37. The tip end of the pin 43 inserted into the hole 42 is therefore, profiled according with the spherical surface of the protrusion 39. In other words, the entirety or part of the protrusion 39 is formed by the tip end of the pin 43.

On the other hand, as shown in FIG. 8(a), no protrusion is formed at the pole of the upper die 31. The hole 42 is formed in a flat place at the pole surrounded by some of the dimple forming protrusions 39, and smaller than that of the lower die 32.

In this embodiment, the EDM vents 9 include straight EDM vents extending radially from the annular slit vents 40 and 41. In the upper die 31, four cross vents 9 are formed around the hole 42. In the lower die 32, five star vents 9 are formed around the hole 37.

At the shaping surface Sf, the gap of the EDM vent 9 is set in the range of not more than 0.06 mm, preferably less than 0.03 mm, but preferably not less than 0.05 mm. Also the gap of the above-mentioned annular slit vents 40 and 41 are set in the same range as the EDM vents 9. Thus, in order to form a EDM vent having such a micro gap, a wire W having a diameter of smaller than 0.05 mm preferably smaller than 0.02 mm is used as a discharge electrode.

Figure 9:
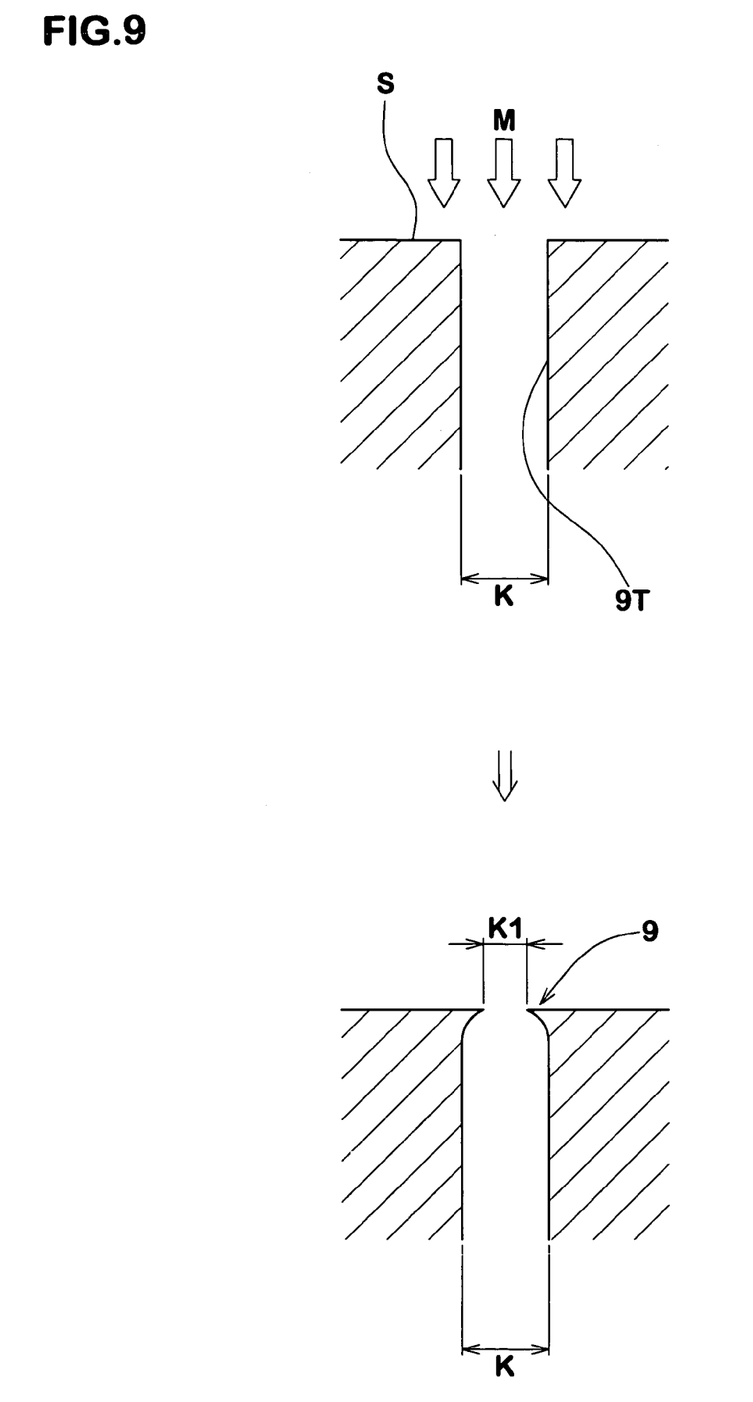
FIG. 9 is a diagram for explaining a method of narrowing an opening of a EDM vent.

For example, if a wire less than 0.03 mm in dia. is difficult to use, it is also difficult to form a gap less than 0.04 mm. It is however possible to form such a very narrow gap by combining another process with the electric discharge machining as follows:

As shown in FIG. 9, firstly, a EDM vent 9T having a gap K wider than the target gap K1 is formed by means of wire electric discharge machining using a relatively thick wire as explained above. Then, the wider gap is narrowed by applying impact force M to the open end portion of the vent so that a permanent deformation is caused and the vent has the target gap K1 at the shaping surface.

In order to apply the impact force M, for example: striking by a hummer or the like; impact processing such as shot blast in which particles or hard small objects collide against the target and the like can be utilized. For example, by utilizing shot blast, a gap of 0.05 mm can be decreased to about 0.01 mm.

In this embodiment, in a state that the pin is not inserted into the hole, the EDM vents 9 are formed by: first putting the wire w through the hole; relatively progressing the shaping surface toward the wire W, while inclining the die as shown in FIG. 7 by an imaginary heavy line drawn on one of the holes 37 of the upper die 31; and repeating this operation around each of the holes at required times, for example four times or five times to form four or five EDM vents.

As described above, according to the present invention, the vents can be easily formed at desired positions with desired lengths. Thus, vent holes can be omitted, and as a result, the formation of spews can be prevented.

The invention claimed is:

1. A forming mold comprising
a shaping surface for shaping a surface of an object to be molded, said shaping surface provided with at least one protrusion, and
a vent structure for releasing air between the shaping surface and said surface, wherein
said vent structure includes EDM vents each having a gap of not more than 0.1 mm at the shaping surface, and
said EDM vents include at least one EDM vent running on the shaping surface, cutting across said at least one protrusion.

2. The forming mold according to claim 1, wherein said object is a rubber article and said gap is not less than 0.01 mm.

3. The forming mold according to claim 1, wherein said object is a rubber tire and said gap is not less than 0.01 mm, and each said at least one protrusion is a rib which forms a tread groove of the tire.

4. The forming mold according to claim 1, wherein said object is precured tread rubber and said gap is not less than 0.01 mm, and each of said at least one protrusion is a rib which forms a tread groove of the tire.

5. The forming mold according to claim 1, wherein said object is a synthetic resin and said gap is not more than 0.06 mm.

6. The forming mold according to claim 1, wherein said object is a resin coated golf ball and said gap is not more than 0.06 mm.

7. A forming mold comprising:
a shaping surface for shaping a surface of an object to be molded, and
a vent structure for releasing air between the shaping surface and said surface, wherein
said vent structure includes EDM vents each having a gap of not more than 0.1 mm at the shaping surface,
said shaping surface is provided with a slit vent defined as a gap between at least two parts of the mold,
said EDM vents include EDM vents extending radially from the slit vent, wherein
said slit vent is an annular slit vent formed between a hole and an insert therein.

8. A forming mold comprising
a shaping surface for shaping a surface of an object to be molded, and
a vent structure for releasing air between the shaping surface and side surface,
said vent structure including EDM vents each having a gap of not more than 0.1 mm at the shaping surface, wherein
said object is a resin coated golf ball,
said shaping surface is provided with protrusions for forming dimples of the golf ball, each said protrusion having a spherical surface,
along the edge of said spherical surface, an annular slit vent is provided, and
two or more of the EDM vents extend radially from the annular slit vent.

9. The forming mold according to any one of claims 1, 7 and 8 wherein
said shaping surface is provided with no vent hole having a diameter of more than 2 mm.

10. The forming mold according to any one of claims 1, 7 and 8 wherein
said shaping surface is provided with no vent hole having a diameter of more than 1 mm.

11. The forming mold according to any one of claims 1, 7 and 8 wherein
said shaping surface is provided with no vent hole having a diameter of more than 0.5 mm.

12. A forming mold for a tire which comprises:
a shaping surface for shaping a surface of the tire to be molded, said shaping surface containing a plurality of circumferentially extending ribs and a plurality of radially extending ribs which define a plurality of tire segments, and
a vent structure for releasing air from between the shaping surface and the surface of the tire being molded and between tire segments, wherein
said vent structure including a plurality of EDM vents which cut across the circumferentially extending ribs radially extending ribs and extend across the entire thickness of the tire segments from the shaping surface to the outer surface of the mold for venting the mold.

* * * * *